United States Patent [19]

Dalal et al.

[11] Patent Number: 5,701,461
[45] Date of Patent: Dec. 23, 1997

[54] METHOD AND SYSTEM FOR ACCESSING A REMOTE DATABASE USING PASS-THROUGH QUERIES

[75] Inventors: Ketan K. Dalal; Stephen Charles Hecht, both of Seattle, Wash.

[73] Assignee: Microsoft Corporation, Redmond, Wash.

[21] Appl. No.: 379,397

[22] Filed: Jan. 27, 1995

[51] Int. Cl.$^6$ .................................................. G06F 17/30
[52] U.S. Cl. ...................... 395/604; 395/610; 395/601; 395/603
[58] Field of Search ............................ 395/600, 200.09, 395/200.15, 700, 601–604, 610

[56] References Cited

U.S. PATENT DOCUMENTS

| | | | |
|---|---|---|---|
| 4,714,995 | 12/1987 | Materna et al. | 395/600 |
| 5,253,341 | 10/1993 | Rozmanith et al. | 395/600 |
| 5,257,366 | 10/1993 | Adair et al. | 395/600 |
| 5,276,870 | 1/1994 | Shan et al. | 395/600 |
| 5,416,917 | 5/1995 | Adair et al. | 395/500 |
| 5,440,744 | 8/1995 | Jacobson et al. | 395/650 |

*Primary Examiner*—Paul V. Kulik
*Attorney, Agent, or Firm*—Klarquist Sparkman Campbell Leigh & Whinston, LLP

[57] ABSTRACT

A method for accessing a database server using pass-through queries includes parsing a database query to separate a pass-through string, and then sending a pass-through string to retrieve information regarding the structure of a remote table. The method further includes fetching data as needed from the remote table, and caching the remote data in a temporary table in memory of the local computer system. The system includes a query processor to compile the database query, a remote engine to retrieve table structure information and fetch data as needed, and a temporary table manager to manage caching of the fetched data.

15 Claims, 4 Drawing Sheets

5,701,461

METHOD AND SYSTEM FOR ACCESSING A REMOTE DATABASE USING PASS-THROUGH QUERIES

TECHNICAL FIELD

The invention relates to shared databases in a computer network, and more specifically to a method and system of accessing a remote database using pass-through queries.

BACKGROUND

Computer systems are widely used to organize and store large amounts of information in a database. Stated very broadly, a database is simply an aggregation of data. More specifically, a database is a file consisting of a number of records, each of which is constructed of fields of a particular type. A relational database stores information in tables consisting of rows and columns of data. The rows of a table represent records-collections of information about separate items—and the columns represent fields—particular attributes of a record.

To access information in a database, a user utilizes a database management system. A database management system is implemented in software that serves as an interface between the user and a database stored in memory of a computer system. Facilitating access to information in the database, the database management system typically includes operations to perform searching (querying), sorting, updating and combining data in the database. In short, the database management system manages all requests for database action.

Most database management systems support the structured query language (SQL), a standard database language used in querying, updating, and managing relational databases. In addition to supporting SQL, database management systems typically provide extensions to SQL as well as additional user interface features to simplify operations on a database.

To facilitate sharing of a large database among many users, a database can be set-up in a database server coupled to a number of computers on a network. A database server is a station on a network dedicated to storing a shared database and processing database requests sent by users from other nodes. In a typical database server/client configuration, a user operating a client computer system sends queries to the remote database server to access the shared database.

Managing the shared database, a relational database management program is installed on the database server. There are a number of commercially available database server applications currently on the market such as SQL Server from Microsoft Corporation and Sybase, Oracle 7 from Oracle Corporation, and Interbase from Borland, to name a few. These database management systems support operations to retrieve and edit data in a database, and also include support for multi-user access, data integrity, and security functions.

On the client side, the user's local system executes an application capable of accessing the remote database server on the network. For example, the client system runs a database management system such as Microsoft Access. Using this program, the user can maintain a database on the client machine and, if necessary, can remotely access a database server.

From an end user's perspective, it is important to be able to obtain data from a remote database, and then perform additional operations on the data with a local database management system. For example, a user may wish to retrieve data about a selected group of customers from the shared database and then combine that data with a local table. As another example, a user may want to retrieve data from a server and then build a report based on the remote data using the local database management system.

Commercially available programs, such as Microsoft Access, enable a user to obtain data from a remote database and perform additional operations on the data. A user can import a database file from a server database by reading the database file from the database server and then storing it on a local disk in a format compatible with the local database management system. This approach, however, is undesirable in cases where the user wants to perform operations on the most recent version of a shared server database. To get the most recent data, the user would have to import the most recent database file. This approach is inefficient because the entire file is usually not needed and copying the entire file generates excess network traffic.

Another way to access a remote database is to attach a table on the server. To attach a remote table, the local database management program creates a network link to the table on the server. After establishing this link, the user can retrieve and edit the remote table and can combine the remote table with local tables. The user issues queries from his or her local machine using the front-end of the local database management system. The local database management program parses the query, and then fetches data from the server database in a manner that is transparent to the user.

By attaching to a remote table, the user obtains additional functionality over importing a remote database file. This approach, however, has a significant drawback. Since the local database management program controls the interface with the remote database, the user typically has little control over the specific query or queries sent by the local program to the database server.

For example, with the attached table approach, the user cannot access additional functionality provided by the remote server. Nor can the user access server-specific functionality such as stored-procedures and server-based intrinsic functions. In addition, the user cannot take advantage of non-standard extensions to SQL supported by the server.

To circumvent the limitations of channeling queries through a local database management system, users want to be able to send pass-through queries directly to the database server. A pass-through query is a query passed to the remote database management system from the local database management system without modification by the local system. The use of pass-through queries facilitates direct communication with the server. If the local database management software supports a pass-through query, the user can directly access server functionality and can more effectively control the query sent to the server.

Unfortunately, existing solutions for supporting pass-through queries suffer from a variety of drawbacks. For example, one existing solution is a software module to be added to a local database management system solely for the purpose of processing a pass-through query. This module requires the user to write a substantial amount of code to issue a pass-through query. Like importing a table from a server, this module returns an entire table from the server which is stored to disk. If the user wants to perform local operations on the results of the pass-through query, the user has to run the pass-through query first, and then perform local operations on the table.

SUMMARY OF THE INVENTION

To address the drawbacks and limitations of existing systems, the invention provides an improved method and system for issuing pass-through queries to a remote database. In one embodiment of the invention, a local database management system first receives a database query, including a pass-through query as input. When the pass-through query is part of a query, a query processor separates the pass-through query and passes it to a remote engine. The remote engine issues the pass-through query to the database server through a network connection. The remote engine only requests information sufficient to establish a temporary table representing the remote database. The temporary table may then be used to perform additional operations on the remote database as if it resided in a local database.

The invention provides several advantages over prior approaches. By using the approach according to the invention, the user can build additional queries on the pass-through query without re-running a number of queries. A temporary table approach is much more efficient than copying an entire table to the client computer system. Remote data can be retrieved as needed thereby minimizing network traffic. To the user, the remote data can be operated upon as if it resided locally even though the remote data is not copied to disk of the local computer system.

Further advantages and features of the invention will become apparent with reference to the following detailed description and accompanying drawings.

DETAILED DESCRIPTION OF THE PREFERRED EMBODIMENT

Figure 1:
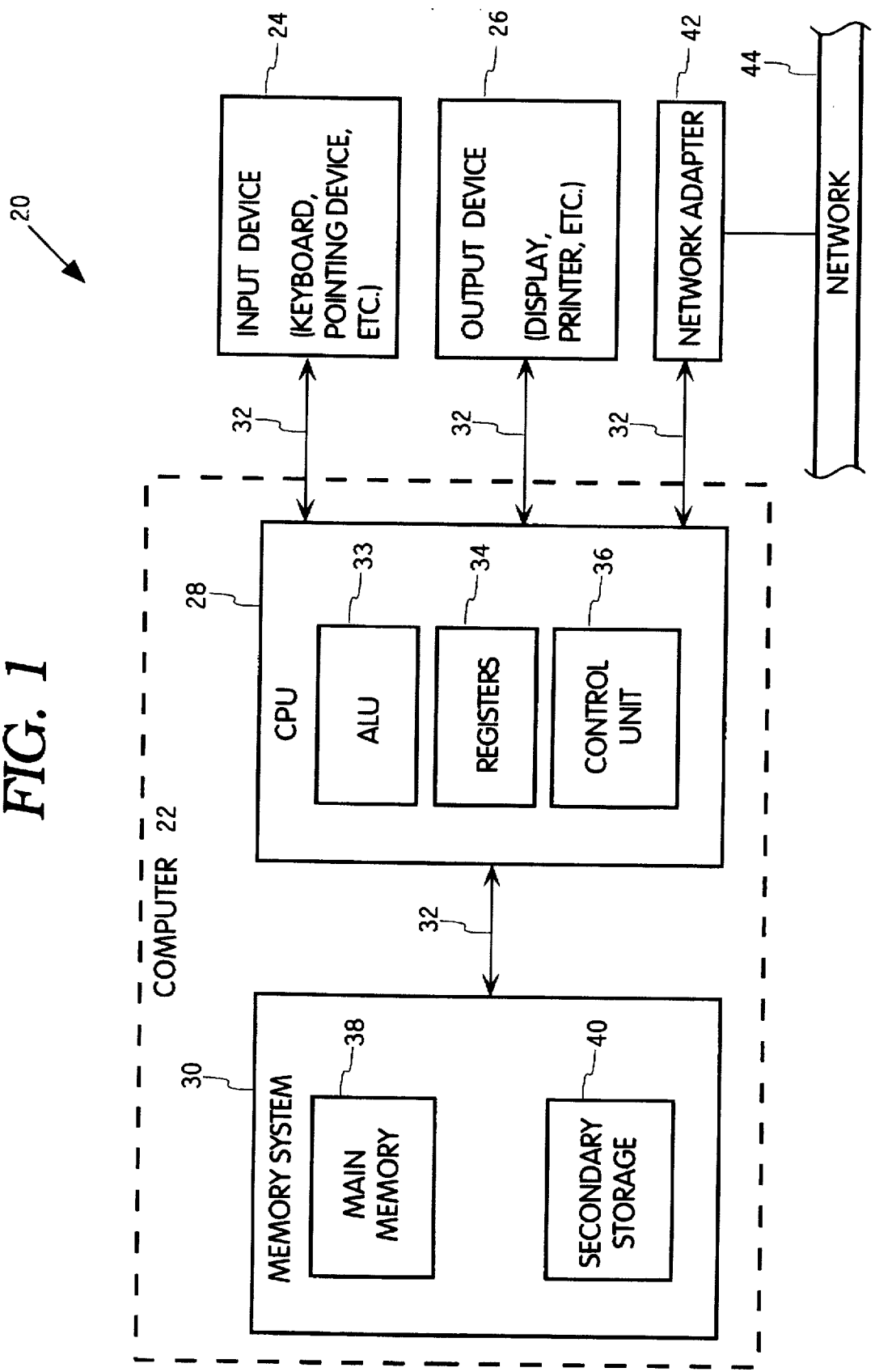
FIG. 1 is general block diagram of a computer system in which the invention can be implemented.

FIG. 1 is a block diagram of a computer system 20 which is used to implement a method and system embodying the invention. Computer system 20 includes as its basic elements a computer 22, input device 24 and output device 26. An embodiment of the invention is implemented in a computer network, including at least two computers coupled together on the network. Whether a computer serves as a client or a database server, it has the same basic architecture as the computer 22.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, modem, printer, sound device or other device for providing output data from the computer.

To enable the computer system to communicate with other computers in a network, the computer system includes a network adapter 42. Allowing the computer to transfer data through the network 44, the network adapter 42 serves as both an input and output device for the computer system. The network adapter is typically an expansion card coupled to an expansion bus 32 of the computer system 20. Alternatively, the network adapter 42 can be another type of peripheral device such as a PCMCIA (Personal Computer Memory Card International Association) network adapter. The type of network adapter 42 also varies depending on the network topology (i.e. a bus, ring, or star configuration), the data transfer medium (i.e. a coaxial cable, twisted pair, or fiber optic cables), and the vendor of the device. These network adapters are readily available and are well-known in the computer industry.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. As another example, the invention may be implemented in an Apple Macintosh computer from Apple Computer. The Macintosh computer system is based on the MC68000 family of processors from Motorola Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

An operating system, loaded into memory of the computer system, provides a number of low level functions to support the operation of an embodiment of the invention. In general, the operating system is responsible for controlling the allocation and usage of a hardware resources such as memory, CPU time, disk space, and peripheral devices. As is well-known, operating systems provide such low level functions as module (process and dynamic link library) management, scheduling, interprocess messaging, memory management, file system management, and graphical user interface support. A number of well-known operating systems are available for the computers listed above. For instance, the Microsoft DOS and Windows operating systems are widely used for computer systems based on the X86 family of processors from Intel Corporation. As another example, the Windows NT operating system can be used with computer systems based on the X86 family of Intel processors as well as RISC machines. As yet another example, the UNIX operating system and variations of it are widely used on a variety of computer systems.

Both the client and database server computer systems are equipped with network support software. Among other things, this support includes network access and communications, network resource allocation and sharing, data protection, and error control. Any of a number of well-known network software packages can provide this functionality. For instance, some operating systems such as Windows NT have this network functionality built in. Other operating systems require the addition of software such as Microsoft's LAN Manager to support network functionality.

Figure 2:
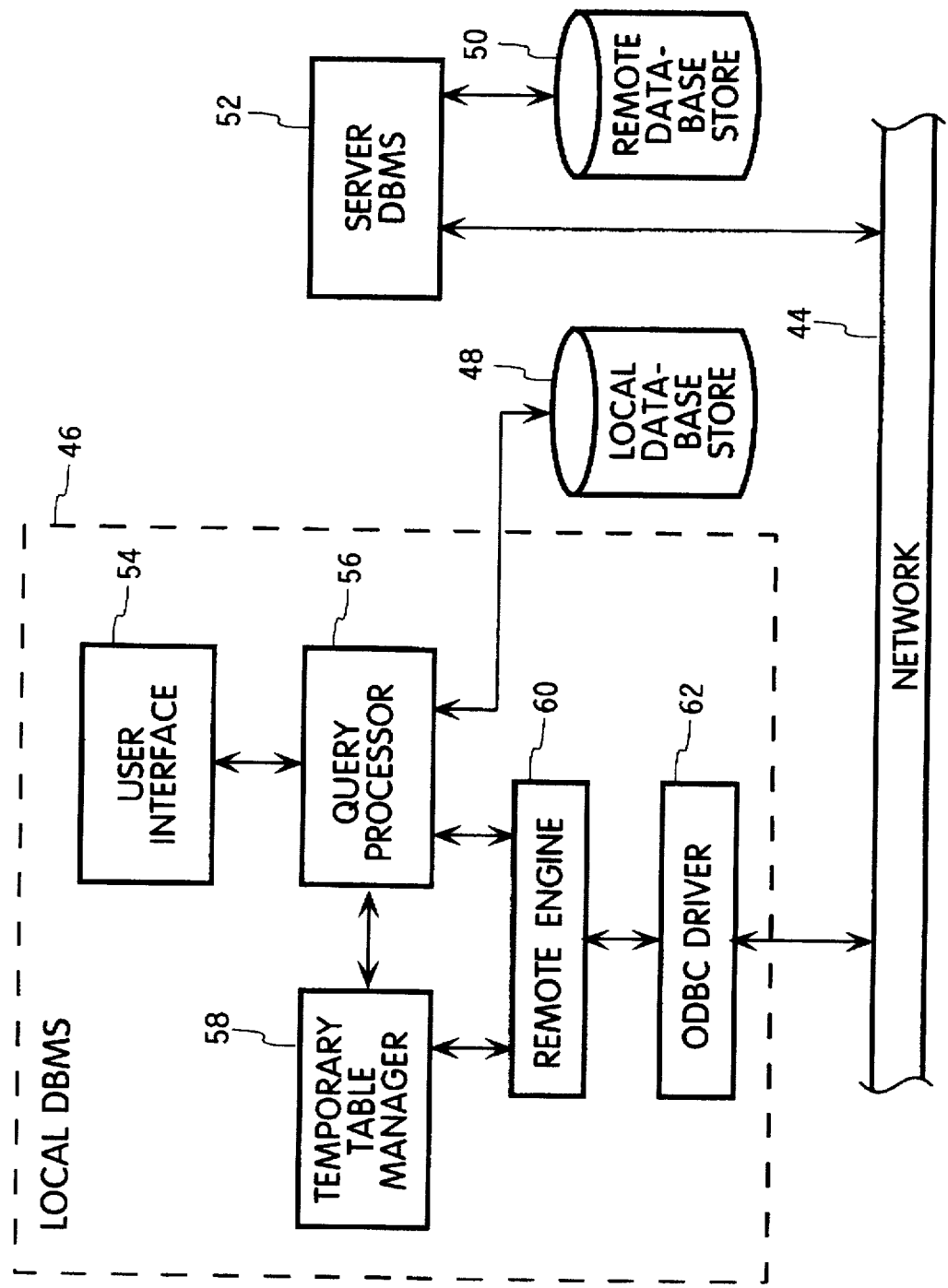
FIG. 2 is a block diagram illustrating the communication among local and remote database management systems according to an embodiment of the invention.

FIG. 2 is a functional block diagram illustrating an embodiment of the invention. The embodiment includes a local database management system (DBMS) 46 for accessing a local database store 48 located in secondary storage of the local computer system. In addition, the local DBMS includes support for accessing a remote database store 50 located in a network server. The local DBMS 46 accesses the remote database store 50 by communicating with the server DBMS 52 on a database server using standard network support software.

Located in a local computer system, the local database management system (DBMS) includes the user interface 54, query processor 56, temporary table manager 58, remote engine 60, and the open database connectivity (ODBC) driver 62. This implementation of the local DBMS 46 refers to the pass-through query support added to Access Version 2.0, a relational database management system developed by Microsoft Corporation. It should be understood that the invention is not limited to the specific features and structure of Microsoft Access Version 2.0; aspects of this design can be modified, extended or altered without departing from the scope of the invention.

FIG. 2 also illustrates one particular network configuration in which the invention can be implemented and used. While FIG. 2 illustrates only one client DBMS 46, it should be understood that a number of client computer systems can be coupled to the database server over the network 44. Conversely, the local DBMS 46 can communicate with one or more server DBMS' located on one or more remote database servers. The local DBMS can even communicate with one or more server DBMS's located on the local computer system through the appropriate ODBC drivers. Many other variations are possible and are well understood by those of skill in the art.

In this implementation, a database engine within the local DBMS performs the primary database management functions of managing requests for database action such as executing queries targeted at local and remote databases. The database engine includes the aforementioned query processor 56, temporary table manager 58, and remote engine 60 components of the local DBMS 46. Implemented as a dynamic link library, the database engine may be called by the user interface to define and compile queries and fetch data from local and remote databases.

Before preceding further in describing the local database management system in detail, it is helpful to first define terms relevant to this implementation of the invention. As noted, a database is a physical and logical grouping of information. From the perspective of the operating system such as Microsoft DOS, a database looks like a single file. Internally the database is a collection of fixed-size pages which contain tables, indexes, and definitions. These components sometimes are realized as separate files. A database may reside locally, meaning that it is stored on disk of the local computer system, or it may reside remotely, meaning that the database physically resides on a database server.

A table in a database consists of (a) attributes and definitions; (b) data records; and (c) indexes over the records. A data record is represented by a row in the table, and the columns of the table represent fields describing particular attributes of the data record. An index on a table specifies a particular logical ordering for the records and provides a means for direct (keyed) retrieval of the records. An index key is a sequence of fields (key segments) from the table, and ascending or descending ordering may be specified for any key segment. Indexes are essentially auxiliary tables (organized as B-trees) which point into a data table.

The database engine can store a database table either as a base table, where the table is stored persistently on disk, or a temporary table, where the table is temporarily buffered or cached in main memory. For example, a base table can be a table in a database file stored in the local database store 48. In contrast to a base table, a temporary table is a cache in main memory of the local computer system (i.e. the RAM) for temporarily storing table data. The process of caching a table from a data source occurs, for example, when results are fetched from a remote database store or when more complex local operations are performed on a base table.

The database engine employs the concept of a virtual table to serve as an interface to a data in a database. As an interface to data in the database, the virtual table provides a common language as to how the underlying data can be opened, closed, fetched, and scrolled. The virtual table also acts as interface for getting information about the columns in a table that it represents. More specifically, the virtual table interface provides a set of functions to enable the local DBMS to perform a common set of functions on the underlying tables that the virtual table represents. For example, the ODBC API provides a limited interface to a remote data source because it does not support a function to, for instance, scroll backwards through a remote table. A virtual table interface augments the ODBC functionality by adding an additional layer of functions to provide access to the data source. A virtual table can be an interface to a base table, a temporary table, or the results of an operation resembling a table but not stored in a separate base or temporary table.

During the compilation of a query, the query processor creates a virtual table to represent a table or the results of an operation on a table. When the query processor creates a virtual table, it returns a handle to the virtual table that can be used as an argument for commands directed toward the underlying data that the virtual table represents. Operations on tables such as a sort or join, for example, receive a virtual table or virtual tables as input, and produce another virtual table to represent the output of the operation.

The local DBMS 46 enables a user to access a remote database using SQL pass-through queries. In this embodiment, the user of the local DBMS 46 can issue a pass-through query to a server DBMS 52 and perform additional operations on top of the pass-through query, such as performing additional queries or creating a form or a report, as if the table from the remote database store 50 resided on the local computer system. As will be explained in further detail below, the process of issuing a query includes the primary steps of defining a query with the user interface, compiling the query with the query processor, and then fetching results from data sources.

The user interface 54 to the local DBMS enables the user to define queries, control their execution, and fetch results. Though not required, the user interface preferably presents a windowing environment such as the user interface of the Windows operating system. An example of this type of user interface for a DBMS is the windowing interface for Microsoft Access Relational Database System. Microsoft Access utilizes the user interface APIs provided by the Windows operating system to present a graphical windowing environment to the user.

Figure 3:
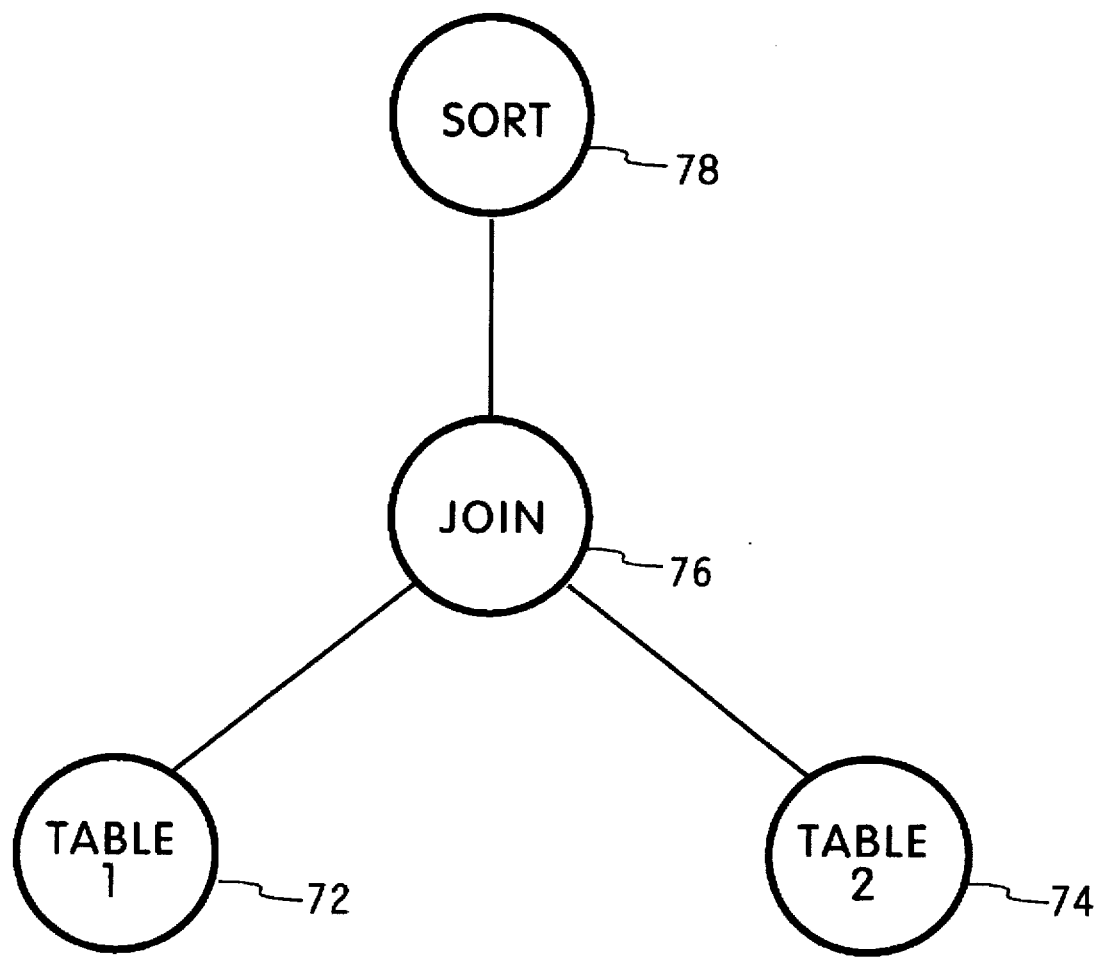
FIG. 3 is a diagram illustrating an example of a run-time tree created during compilation of a database query.

The query processor 54 compiles and executes queries. The query processor 54 receives as input a query defined by the user. The query processor 54 then compiles the query and creates a run-time tree. The nodes in the run-time tree represent operations on a data source, while the leaves of the tree represent the data sources. FIG. 3 illustrates an example of a run-time tree 70, where the leaves 72, 74 of the tree are two tables: table 1, and table 2. Virtual tables represent tables 1 and 2 for the purposes of opening and closing the tables, fetching data to allow scrolling through the tables, and retrieving information about columns in the tables. These tables 72, 74 represent data sources such as a base table in the local database store 48 or a remote table in the remote database store 50. A first node 76 in the tree represents a join operation, while a second node 78 represents a sort operation to be performed on the result of the join operation. Like the input tables to the operations, the results of these operations are also represented by virtual tables.

In general, methods for generating a run-time tree from an SQL statement are well-known. The specific method used to produce a run-time tree is not critical to the invention. The part of the compilation process dealing with the pass-through query, however, is important. We provide more detail regarding the operation of the query processor with respect to queries including a pass-through component below.

The temporary table manager 58 controls the temporary storage of table data on an as needed basis. For example, the temporary table manager 58 controls the caching of rows from the table as they are fetched from a remote database. Working in conjunction with the operating system, the temporary table manager 58 allocates memory for a temporary table. When the user completes tasks relating to the temporary table, the temporary table manager 58 cleans up the temporary table by de-allocating the memory set aside for it. Based on the available main memory in the local computer system, the temporary table manager 58 defines a maximum memory capacity for a temporary table. If during data fetching the amount of data fetched exceeds this maximum, then the temporary table manager controls data swapping between secondary storage on disk and main memory.

The remote engine 60 controls communication with remote data sources. In this embodiment, the remote engine 60 communicates with remote data sources by making calls to the ODBC driver 62 associated with the remote data source. During the compilation phase, the remote engine 60 accesses a remote table to obtain a description of the remote table's structure, i.e. the names and types of the columns. Later to fetch data, the remote engine retrieves the data from the remote table. In both the compilation and data fetching steps, the remote engine 60 accesses the remote database by making the appropriate function calls to the ODBC driver 62 associated with the remote database.

The ODBC driver 62 implements a standard application programming interface (API) for allowing communication with a database. Defined by the SQL Access Group (SAG), this API provides a standard interface to promote compatibility among database related products. For each type of server DBMS, the associated ODBC driver maps functions native to the DBMS server to corresponding functions in ODBC API. Most of the popular server database products have at least one ODBC driver associated with them, so there are a number of ODBC drivers that may be used in this implementation of the invention. One or more ODBC drivers can be loaded with the local DBMS 46 to provide access to one or more corresponding server DBMSs 52.

In this embodiment, the ODBC driver 62 is a DLL that allows the local DBMS 46 to connect to a database server. The ODBC driver 62 retrieves data from the server and returns any errors so that they can be displayed with the user interface. The ODBC driver 62 communicates with the server DBMS using commercially available networking software such as Novell's NetWare or Microsoft's LAN Manager. While ODBC drivers present the best alternative from a compatibility standpoint, the remote engine 60 could use special purpose software designed to allow the remote engine 60 to communicate with a particular server DBMS.

Figure 4:
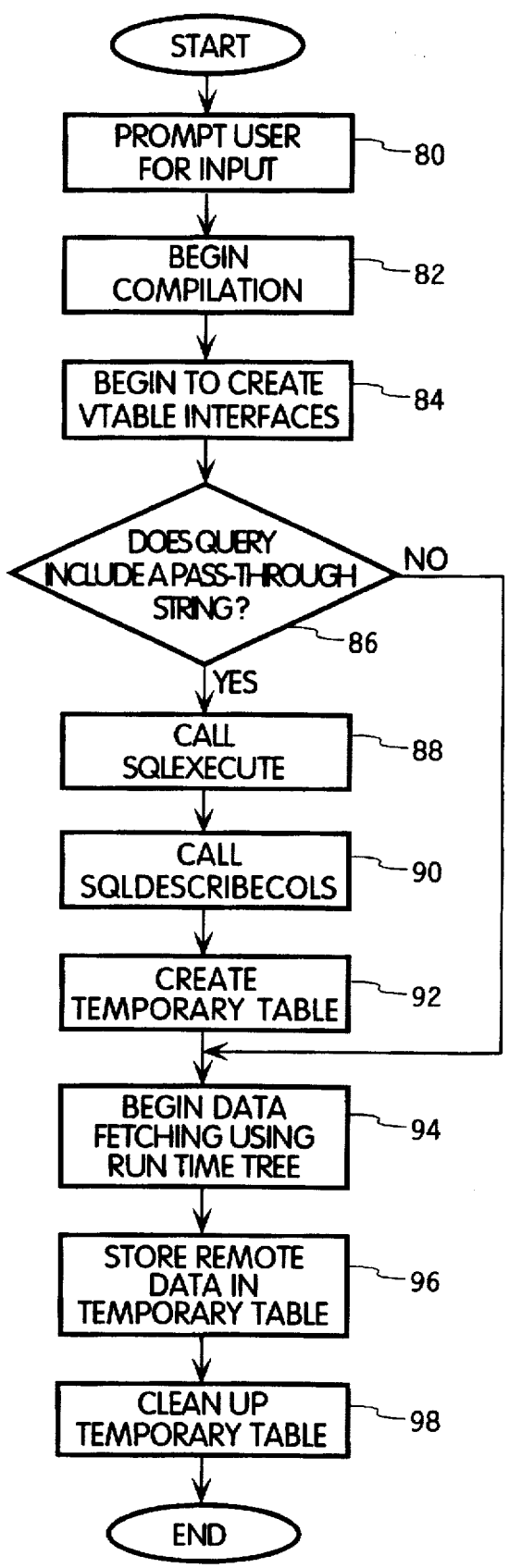
FIG. 4 is a flow diagram of a method for accessing a remote database using a pass-through query according to an embodiment of the invention.

Having described the elements of the system for accessing a remote database, we can now describe the operation of an exemplary embodiment of the invention with reference to FIG. 4. FIG. 4 is a flow diagram of a method for accessing a remote database using a pass-through query according to an embodiment of the invention.

The method begins when the user enters a query via the user interface 54. In a first step 80, the user interface 54 prompts the user to input a text string representing the query. For pass-through queries, the user can enter the pass-through portion simply by typing the text of the authentication information and the pass-through text string. The user interface 54 supports an ODBC connect string builder, which relieves the user of having to remember the details of the connect string. Since this embodiment conforms to the ODBC standard, a pass-through query includes an ODBC connect string and a pass-through string.

The following is an example of an ODBC connect string: "DSN=MyServer; DATABASE=SalesData; UID=joe; PWD=java;" The ODBC connect string identifies the data source name (DSN), database name, user identification (UID) and password (PWD). This connect string is only an example; many other variations are possible. In this implementation, a valid ODBC connect string is any connect string that comports with the ODBC standard as defined by SAG.

The pass-through string is in a dialect acceptable to the ODBC driver and the database server associated with that driver. The pass-through string can include any SQL command acceptable to the server, including data manipulation language (DML) and a data definition language (DDL) statements, as well as stored-procedure invocations.

The following is an example of a statement in a data manipulation language:

```
"select col1 from foo"
"delete * from foo"
```

This statement selects column 1 from a table named "foo" and deletes the column using the wildcard character, "*"
The following is an example of a statement in DDL:

```
CREATE TABLE employees (
    emp-name varchar (30),
    emp-salary money,
    emp-photo image)
```

This statement creates a table named "employees" including the employee's name, salary and photo.

The following are examples of stored-procedure invocations: "SP-WHO"; When sent to an SQL server, this procedure returns a list in table form of users currently logged on. "SP-LOCK"; This procedure returns a list of all of the users, listed by user Id, that are currently holding locks to a remote database.

After defining the query via the user interface, the user can then save the query on disk. This simply involves giving the query a name and entering a command to save the query under this name. Once created, a query can be used as a basis for other queries, forms, or reports.

A pass-through query can be used as the basis of another query including the results of pass-through and/or local queries. One application of this capability involves joining the results of two stored-procedures in a database server. Since the server cannot perform a join operation of the results of two stored-procedures, the join operation must be performed locally. From the local DBMS, the only way to obtain the results of the stored-procedures is to execute the stored-procedures using pass-through queries. As such, the local DBMS executes the two stored-procedures as pass-through queries, and then uses these pass-through queries as inputs to a local join operation. To define this query, the user builds a pass-through query for each stored-procedure. The user then defines a local join operation using the pass-through queries as inputs to the join operation.

The following is an example of a query joining the results of two pass-through queries. Assuming that the pass-through queries containing SP_WHO and SP_LOCK are respectively called, "Q_spwho" and "Q_splock", the join is:

```
SELECT *
FROM Q_spwho, Q_splock
WHERE Q_spwho.userid = Q_splock.userid
```

This query means select all columns (SELECT *) from the pass-through queries, Q_spwho and Q_splock, having the same user identification number.

As another example, a pass-through query can be joined with a local base table. The following is an example of such a query:

```
SELECT *
FROM Q_spwho, T_UserNames
WHERE Q_spwho.userid = T_UserNames.userid
```

This query means select all columns from the pass-through query, Q_spwho, and the local base table, T_UserNames having the same user id.

Assuming T_UserNames.userid is indexed, the query processor can perform the join as follows: For each row of the results of the pass-through query, Q_spwho, use the index on T_UserNames.userid to look up the Q_spwho.userid. In this way, Q_spwho only has to be scanned forward once.

As is apparent from the preceding examples, the user can build queries on top of pass-through queries. This capability enables user to make extensions to remote queries that must be sent as pass-through queries. The user can perform operations on one or more pass-through queries as well as pass-through queries in combination with local tables. To take advantage of this capability, the user merely has to define the query at the user interface 54 as set forth above.

After the definition of the query, the next step 82 is to begin compilation of the query. The query processor 56 begins to compile a query when the user interface calls an open query function, passing the name of the query to the query processor 56. The query processor 56 generates an execution plan for a query in the form of a run-time tree. FIG. 3 illustrates an example of the form of this run-time tree. The run-time tree includes a tree of operations where the leaves are tables and the root is the final query result set.

Disregarding the sort operation 78, the run time tree in FIG. 3 illustrates the basic structure of a run time tree for the two examples above. In the first example of joining two pass-through queries, table 1 and table 2 correspond to Q_spwho, Q_splock, respectively. In the second example, table 1 and 2 correspond to Q_spwho, T_UserNames.

In step 84, the query processor begins the process of creating virtual table (vtable) interfaces representing the tables to be operated upon as well as the results of the operations in the query. In this implementation, this step 84 begins when the query processor 56 compiles a query. The query processor 56 creates a virtual table for each data source in the query and returns a handle associated with the virtual table. This handle can be then be used as an argument for commands performed on tables, whether the underlying data resides in a temporary table, or a base table.

In the process of compiling a query, the query processor 56 parses the query and determines whether it includes a pass-through string. This process is illustrated as decision step 86 in FIG. 4. If the query does include a pass-through string, then the query processor calls the remote engine 60 to determine the structure of the temporary table that will contain the results of the pass-through query. The query processor passes the ODBC connect string and pass-through string to the remote engine 60.

The remote engine 60 then calls the ODBC driver 62 associated with the database server where the data source resides to access the data source identified in the ODBC connect string. In step 88, the remote engine 60 calls SQLExecute, passing the ODBC connect string and pass-through string to the ODBC driver. The ODBC driver returns a handle. Since an ODBC driver typically allows the user to run multiple queries concurrently, it returns this handle as an identifier of the query.

Then in step 90, the remote engine 60 calls SQLDescribeCols, which returns the remote table's structure in terms of the names and types of columns that result from issuing the pass-through query to the server DBMS 52. If results of the pass-through query have a tabular form, the remote DBMS 52 returns an array of column names and types from the remote database store 50. In some cases, the SQLDescribeCols function will return no column data. This occurs for pass-through queries where no table results are expected such as when the user creates a remote table. This also occurs, of course, when the pass-through query returns an error.

When the remote engine 60 receives the names and types of columns, it uses the temporary table manager 58 to create a temporary table, shown as step 92 in FIG. 4. The remote engine 60 passes the table structure data to the temporary table manager 58. Using this table structure, the temporary table manager 58 creates a temporary table. A virtual table interface is also created for the temporary table to support such functions as scrolling up and down through results of the pass-through query, fetching additional data from the pass-through query, and closing the pass-through query. In effect, the virtual table interface for this temporary table provides another interface layer in addition to the ODBC API to provide this additional functionality.

The server DBMS 52 may also return data for more than one row in response to the SQLDescribeCols call. In this case, the remote engine 60 transfers the data to the temporary table, where the data is cached.

At this point, the compilation phase ends and the data can now be fetched to retrieve the results of the query as needed. At the end of the compilation phase, the query processor 56 has built the run time tree and has created the virtual table interfaces for data sources as well as the results of database operations on those data sources.

The begin fetch step 94 in FIG. 4 refers to the process of fetching data as needed from remote tables. The fetching process begins if the user requires additional data from a remote database table than is already cached in the temporary table associated with it. The need to fetch additional data can occur, for example, as a user scrolls through the results of the query.

As the user requests the results of the query, the query processor 60 manages the accessing of the data through the virtual tables created in the compilation phase. Virtual tables represent interfaces to data sources in the run-time tree of the query. Virtual tables also represent the results of operations performed on the data sources. In response to commands from the user, the user interface 54 issues the requests for data through the virtual table interface representing the results of the query. If the data requested includes data from a remote table and this data has not already been cached in a temporary table, the remote engine 60 has to fetch additional data from the remote table.

The remote engine 60 attempts to fetch only as much data as is necessary to fulfill the user's request for results of the query. This concept can be illustrated by referring to the example of joining a pass-through query with a local base table above. The user may wish to view only the first 25 rows of the query results. The query processor 56 asks the remote engine 60 to provide the results requested by the user. The remote engine 60 first determines whether the results already reside in a temporary table by sending a request to the temporary table manager 58. If the temporary table manager 58 returns a value indicating that the temporary table does not have the requested results, then the remote engine 60 must fetch additional rows from Q_spwho. As rows are fetched, they are cached in the temporary table. If the user closes the query before reaching the end of the results of Q_spwho, than no more data has been fetched than was necessary.

The remote engine 60 calls functions in the ODBC driver 62 to obtain remote data. These functions include: SQLFetch and SQLGetData, standard functions in the ODBC API used to retrieve data from a table.

In step 96, the temporary table manager 58 stores the fetched data in the temporary table established during the compilation phase. As the remote engine fetches data from a remote table, it is cached in the temporary table. If the capacity of the temporary table is exceeded, the temporary table manager 58 swaps portions of the data to secondary storage. The temporary table manager 58 maintains remote table data in a temporary table until the user finishes using the results of the query and exits it.

Finally, in step 98 the query processor 56 closes the virtual table associated with the temporary table when the user exits the query. The temporary table manager 58 then cleans up any temporary tables by de-allocating the memory originally assigned to them.

While a specific embodiment has been described in detail, it should be understood that this implementation can be modified without departing from the scope of the invention. A method according to the invention can be implemented in a DBMS having an alternative architecture than the one illustrated in FIG. 2. As an alternative to the ODBC driver 62, another server driver could be written to communicate with a server database. The specific commands used to control a remote server database can vary, as can the network support software used to convey these commands and data between the client and server.

The flow diagram of FIG. 4 provides an example of the steps carried out to perform queries having a pass-through component. This diagram should not be used to limit the scope of the invention because the steps can be modified slightly, or re-arranged without departing from the scope of the invention. For example, the specific steps referring to ODBC functions may vary if ODBC drivers are not used or the ODBC standard is not supported. In addition, the use of vtable interfaces is specific to the preferred embodiment, and is not the only way to open, close, or fetch data from a database query.

In view of the many possible embodiments to which the principles of our invention may be put, it is emphasized that the detailed embodiment described herein is illustrative only and should not be taken as limiting the scope of our invention. Rather, we claim as our invention all such embodiments as may come within the scope and spirit of the following claims and equivalents thereto.

We claim:

1. A method for accessing a database server on a computer network using a pass-through query, the method comprising:

receiving a database query in a local database management system in a local computer system during runtime of the local database management system;

parsing the database query to identify the pass-through query in the database query;

from the local computer system on the computer network, sending the pass-through query to the database server to obtain table structure data associated with results of the pass-through query;

receiving the table structure data of the results of the pass-through query from the database server;

caching the table structure data in a temporary table in main memory of the local computer system;

determining whether requested results are already cached in the temporary table in response to a user request for the requested results;

fetching the data as needed from the database server to obtain the requested results of the pass-through query if the requested results are not already cached in the temporary table;

caching the requested results in the temporary table if the requested results are not already cached in the temporary table; and using the table structure data to create an interface for fetching data from the database server;

and using the interface as an input to a local database operation in the database query performed by the local database management system in the local computer system.

2. The method of claim 1 including the step of compiling the database query including a first and second pass-through query in the local computer system;

issuing the first and second pass-through queries to a database server to obtain a first table structure data associated with results of the first pass-through query, and a second table structure data associated with results of the second pass-through query;

receiving the first and second table structure data of the results of the first and second pass-through queries from the database server;

using the first and second table structure data to create first and second interfaces for fetching data from the database server;

caching the first and second table structure data in a first and second temporary table, respectively, in main memory of the local computer system;

fetching data from the database server to obtain requested results of the first pass-through query if the requested results are not already cached in the first temporary table;

caching the requested results of the first pass-through query in the first temporary table if the requested results are not already cached in the first temporary table;

fetching data from the database server to obtain requested results of the second pass-through query if the requested results are not already cached in the second temporary table; and caching the requested results of the second pass-through query in the second temporary table if the requested results are not already cached in the second temporary table.

3. The method of claim 1 wherein the step of sending the pass-through query includes sending a pass-through string to the database server for execution and requesting a description of column data associated with the pass-through query.

4. The method of claim 1 wherein the table structure data is an array of column data associated with the pass-through query.

5. A method for accessing a database server on a computer network using a pass-through query, the method comprising:

receiving a database query in a local computer system on the computer network;

parsing the database query to determine whether the database query includes a pass-through query including a pass-through string; and if the database query includes a pass-through query, then sending the pass-through string without modification to the database server for execution by a remote database management system on the database server;

requesting table structure data representing results of the pass-through query from the database server;

receiving the table structure data representing the results of the pass-through query from the database server;

fetching data from the database server to obtain requested results of the pass-through query as needed;

caching the requested results in a temporary table in main memory of the local computer system; and in the local database management system, performing a local database operation on the pass-through query as expressed by a user in the database query, by using the table structure data representing the results of the pass-through query as input to the local database operation.

6. The method of claim 5 further including the step of creating the temporary table to store the results of the pass-through query in response to receiving the table structure data.

7. The method of claim 6 further including the step of caching the table structure data in the temporary table.

8. The method of claim 5 further including the steps of:

caching the table structure data in the temporary table;

receiving a user request to provide results of the pass-through query at the local computer system;

determining whether the user request requires fetching of requested results from the database server; and if the fetching of requested results from the database server is required, then fetching data from the database server to obtain the requested results of the pass-through query as needed.

9. The method of claim 8 wherein the determining step includes checking the temporary table to determine whether the requested results are present in the temporary table.

10. The method of claim 5 wherein the local database operation is a join operation between the results of the pass-through query and a local base table.

11. The method of claim 5 wherein the local database operation is a join operation between the results of the pass-through query and results of a second pass-through query.

12. A programmed local computer system on a computer network for accessing a database server on the computer network using a pass-through query comprising:

a query processor for parsing a database query to identify a pass-through query in the database query;

a remote engine in communication with the query processor for receiving the pass-through query from the query processor, and, in communication with the database server on the computer network, for executing the pass-through query to obtain table structure data representing results of the pass-through query, and for fetching requested results of the pass-through query; and a temporary table manager in communication with the remote engine for caching table structure data in a temporary table in local memory, and, in communication with the remote engine, for caching requested results of the pass-through query; and wherein the query processor is operable to parse the database query including both the pass-through query and a local database operation on the pass-through query, and is operable to perform the local database operation on the results of the pass-through query.

13. The programmed local computer system of claim 12 wherein the remote engine is in communication with the temporary table manager for determining whether user requested results are cached in the temporary table.

14. The programmed local computer system of claim 12 wherein the local database operation is a join operation.

15. The programmed local computer system of claim 12 further including a user interface operable to enable a user to enter the database query including the pass-through query and the local database operation on the pass-through query; and wherein the query processor is operable to parse the database query including both the pass-through query and the local database operation on the pass-through query, and is operable to perform the local database operation on the results of the pass-through query.

* * * * *

UNITED STATES PATENT AND TRADEMARK OFFICE
CERTIFICATE OF CORRECTION

PATENT NO. : 5,701,461
DATED : December 23, 1997
INVENTOR(S) : Ketan K. Dala, et al.

It is certified that error appears in the above-indentified patent and that said Letters Patent is hereby corrected as shown below:

Column 3, line 33, "is general" should read --is a general--.

Column 4, line 65, "of a hardware" should read --of hardware--.

Column 8, line 52, "java;" The" should read --java;". The--.

Column 10, line 38, "can be then be" should read --can then be--.

Column 11, line 29, "than" should read --that--.

Column 11, line 59, "than" should read --then--.

Signed and Sealed this

Eleventh Day of August 1998

Attest:

BRUCE LEHMAN

Attesting Officer

Commissioner of Patents and Trademarks